United States Patent Office 3,484,486
Patented Dec. 16, 1969

---

3,484,486
HYDROXY DIFLUORAMINO DERIVATIVES OF CYCLOHEXANE OR CYCLOPENTANE
James Grigor, Coatbridge, and John Peters, Saltcoats, Scotland, assignors, by mesne assignments, to the United States of America as represented by the Secretary of the Navy
No Drawing. Filed Nov. 6, 1962, Ser. No. 235,886
Claims priority, application Great Britain, Nov. 30, 1961, 42,969/61
Int. Cl. C07c 91/04, 91/14
U.S. Cl. 260—563               4 Claims The present invention relates to hydroxy(difluoramino) derivatives of ketones and their preparation.

It has been suggested that acetone reacts with difluoramine to give the hydroxy-difluoramino derivative of acetone but it has now been found that, in fact, an equilibrium mixture of acetone, difluoramine and the hydroxy-difluoramino derivative of acetone is produced. Removal of difluoramine shifts the equilibrium back towards difluoramine and acetone and the method does not permit the isolation of a pure sample of the hydroxy-difluoramino derivative of acetone.

Our investigations reveal that the reaction may be carried out with other ketones and the resulting hydroxy-(difluoramino) derivatives isolated.

According to the present invention, difluoramine is reacted with an aliphatic ketone to give the hydroxy(difluoramino) derivative of the ketone. The aliphatic ketone may be an acyclic aliphatic monoketone having a formula RR'CO where R is a methyl or ethyl group and R' is an alkyl group containing not more than 4 carbon atoms. The aliphatic ketone may be cyclic aliphatic ketones or diketones selected from the group including cyclohexanone, cyclopentanone, cyclohexan-1,4-dione, biacetyl and acetyl acetone. According to one aspect of the present invention, difluoramine is reacted with an acyclic aliphatic monoketone having a formula RR'CO where R is a methyl or ethyl group and R' is an alkyl group containing not more than 4 carbon atoms to give the hydroxy(difluoramino) derivative of the ketone.

According to another aspect of the present invention, difluoramine is reacted with a ketone selected from the group including cyclohexanone, cyclopentanone, cyclohexan-1,4-dione, biacetyl and acetyl acetone to give the hydroxy(difluoramino) derivative of the ketone. The hydroxy(difluoramino) derivatives of the alicyclic ketones have, respectively, the formulas:

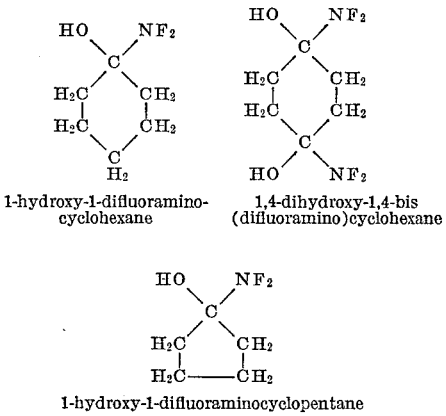

1-hydroxy-1-difluoramino-cyclohexane 1,4-dihydroxy-1,4-bis(difluoramino)cyclohexane and 1-hydroxy-1-difluoraminocyclopentane The reaction may be carried out merely with the reacting media or in solution.

These hydroxy(difluoramino) derivatives of ketones are useful high energy propellant explosive ingredients. They can be induced to explode and, when ignited, burn rapidly with a fierce flame.

The invention will be more fully understood if reference is made to the following examples.

PREPARATIVE

The general method of reaction used in the examples was as follows:

Difluoramine gas was led into a "cold finger" condenser cooled to $-80°$ C. with a solid carbon dioxide/acetone mixture and the liquefied difluoramine refluxed on to the ketone or to a solution or suspension of the ketone. The reaction solution was stirred by a slow stream of nitrogen. After up to 4 hours' reflux the excess difluoramine was allowed to evaporate off. The product remaining was the hydroxy-difluoramino derivative of the ketone either pure or in solution.

EXAMPLE 1

Cyclohexanone (1.30 g.) was treated as above with difluoramine (4.5 g.). On completion of the reaction the product was 1-hydroxy-1-difluoramino-cyclohexane (1.93 g.), M.P. 49–50° C.
Analysis gave: C, 47.8; H, 7.2; N, 9.3; F, 25.5%. $C_6H_{11}F_2NO$ requires C, 47.7; H, 7.3; N, 9.3; F, 25.2%.

EXAMPLE 2

Cyclohexane 1,4-dione (0.86 g.) was dissolved in dry ether (7.0 cc.) and treated as above with difluoramine (4.5 g.). The ether was evaporated under nitrogen to give 1,4-dihydroxy-1,4-bis(difluoramino)cyclohexane (1.57 g.) as a white crystalline solid, M.P. 145° C. Analysis gave: N, 13.1; F, 34.2%. $C_6H_{10}F_4N_2O_2$ requires N, 12.85; F, 34.86%.
Analysis of the product showed characteristic absorption at 2.9, 10.45, 11.2 and 11.7$\mu$ in the infrared region.

EXAMPLE 3

Cyclohexane 1,4-dione (0.51 g.) was suspended in water (2.0 cc.) and treated with difluoramine (4.5 g.) as above. On being allowed to stand at room temperature overnight 1,4-dihydroxy-1,4-bis(difluoramino)cyclohexane (0.45 g.) M.P. 145° C. separated from solution.

EXAMPLE 4

Cyclopentanone (2.30 g.) was treated as above with difluoramine (9.0 g.). The reaction product, 1-hydroxy-1-difluoraminocyclopentane (3.5 g.) was a colourless oil crystallising to a white solid at about 10° C. Analysis gave: C, 41.7; H, 6.4; N, 9.8; F, 24.8%. $C_5H_9F_2NO$ requires C, 43.8; H, 6.6; N, 10.2; F, 27.7%.
The product showed characteristic absorption at 2.9, 10.4, 10.6 and 11.6$\mu$ in the infrared region.

EXAMPLE 5

Methyl ethyl ketone (2.50 g.) was treated as above with difluoramine (9.0 g.). The reaction product, 2-hydroxy-2-difluoraminobutane (4.28 g.) was a colourless liquid. The product showed characteristic absorption at 2.85, 10.25, 10.45 and 11.4$\mu$ in the infrared region. Analysis gave: C, 38.5; H, 7.1; N, 8.6; F, 30.1%. $C_3H_9F_2NO$ requires: C, 38.4; H, 7.2; N, 11.2; F, 30.4%.

EXAMPLE 6

Acetylacetone (0.98 g.) was treated with difluoramine (9.0 g.) as above. The product was 2,4-dihydroxy-2,4-bis(difluoramino)pentane (1.86 g.) which showed characteristic absorption at 2.9, 10.2 and 11.3$\mu$ in the infrared region.

EXAMPLE 7

Biacetyl (1.24 g.) was treated with difluoramine (4.5 g.) as above. The product was 2,3-dihydroxy-2,3-bis(difluoramino)butane (1.94 g.) which showed characteristic absorption at 2.9, 10.15 and 11.35µ in the infrared region.

We claim:
1. An alicylic hydroxy difluoramino compound of the group consisting of 1-hydroxy-1-difluoraminocyclohexane, 1,4-dihydroxy-1,4-bis(difluoramino)cyclohexane and 1-hydroxy-1-difluoraminocyclopentane.
2. 1-hydroxy-1-difluoramino-cyclohexane.
3. 1,4-dihydroxy-1,4-bis(difluoramino)cyclohexane.
4. 1-hydroxy-1-difluoraminocyclopentane.

References Cited

UNITED STATES PATENTS

| 3,345,398 | 10/1967 | Rhodes | 260—467 |
| 3,349,129 | 10/1967 | Stogryn et al. | 260—584 |
| 3,358,013 | 12/1967 | Freeman et al. | 260—482 |

LELAND A. SEBASTIAN, Primary Examiner

U.S. Cl. X.R.

149—109; 260—584